United States Patent
Kitagawa et al.

(10) Patent No.: US 12,472,949 B2
(45) Date of Patent: Nov. 18, 2025

(54) TRAVEL CONTROLLER AND TRAVEL CONTROL METHOD

(71) Applicant: TOYOTA JIDOSHA KABUSHIKI KAISHA, Toyota Aichi-ken (JP)

(72) Inventors: Eiki Kitagawa, Edogawa-ku Tokyo-to (JP); Satoru Akahane, Shinjuku-ku Tokyo-to (JP); Yoshihiro Aotani, Kawasaki Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/222,522

(22) Filed: Jul. 17, 2023

(65) Prior Publication Data
US 2024/0034322 A1 Feb. 1, 2024

(30) Foreign Application Priority Data

Jul. 27, 2022 (JP) ................................. 2022-119819

(51) Int. Cl.
*B60W 30/18* (2012.01)
*B60W 40/04* (2006.01)
(Continued)

(52) U.S. Cl.
CPC ...... *B60W 30/18163* (2013.01); *B60W 40/04* (2013.01); *G08G 1/167* (2013.01); *B60W 60/0027* (2020.02)

(58) Field of Classification Search
CPC .......... B60W 30/18163; B60W 40/04; B60W 60/0027; B60W 30/18009;
(Continued)

(56) References Cited

U.S. PATENT DOCUMENTS 7,711,485 B2 * 5/2010 Matsumoto ............ G01C 21/26
  382/104
10,449,967 B1 * 10/2019 Ferguson ............. G08G 1/0129
(Continued)

FOREIGN PATENT DOCUMENTS

JP         6188771 B2   8/2017
JP     2020-006818 A   1/2020
(Continued)

*Primary Examiner* — Rachid Bendidi
*Assistant Examiner* — Hossam M El Abd Latif
(74) *Attorney, Agent, or Firm* — Dinsmore & Shohl LLP

(57) ABSTRACT

A travel controller determines whether a traveling lane in which a vehicle is traveling is a merged lane into which a merging lane merges using peripheral data that represents a surrounding situation of the vehicle, and while the traveling lane is the merged lane, repeatedly performs yielding determination to detect a merging vehicle traveling in the merging lane from the peripheral data, and to determine whether or not yielding control for securing a larger space for the merging vehicle to change the lane to the merged lane is necessary, the yielding determination at the first time being performed based on a relative positional relationship between the merging vehicle and the vehicle, the yielding determinations at the second and subsequent times being performed based at least on a result of a previous yielding determination, and controls travel of the vehicle according to the result of the yielding determination.

7 Claims, 4 Drawing Sheets

(51) Int. Cl.
*B60W 60/00* (2020.01)
*G08G 1/16* (2006.01)

(58) Field of Classification Search
CPC ... B60W 2554/4045; B60W 2554/802; B60W 2556/10; G08G 1/167; G08G 1/16
USPC .......................................................... 701/26
See application file for complete search history.

(56) References Cited

U.S. PATENT DOCUMENTS

| | | | | |
|---|---|---|---|---|
| 2020/0010088 | A1* | 1/2020 | Kokaki | B60W 30/188 |
| 2020/0193833 | A1* | 6/2020 | Matsunaga | G05D 1/0212 |
| 2020/0391738 | A1* | 12/2020 | Isele | B60W 60/00276 |
| 2022/0084397 | A1* | 3/2022 | Tanaka | G08G 1/167 |
| 2022/0180750 | A1* | 6/2022 | Chen | G08G 1/166 |

FOREIGN PATENT DOCUMENTS

| | | |
|---|---|---|
| JP | 2020-095474 A | 6/2020 |
| JP | 2020-115262 A | 7/2020 |
| WO | 2018/158875 A1 | 9/2018 |

* cited by examiner

TRAVEL CONTROLLER AND TRAVEL CONTROL METHOD

CROSS-REFERENCE TO RELATED APPLICATION

This application claims priority to Japanese Patent Application No. 2022-119819 filed on Jul. 27, 2022, the entire contents of which are herein incorporated by reference.

FIELD

The present disclosure relates to a travel control method and a travel controller for controlling travel of a vehicle.

BACKGROUND

A vehicle whose travel is controlled by a travel controller is required to travel in response to behaviors of other vehicles traveling in the surroundings. The travel controller described in Japanese Unexamined Patent Publication (Kokai) No. 2020-006818 detects a target vehicle, which is a vehicle expected to enter a traveling lane in which a host vehicle is traveling and, if the state of the host vehicle and the positional relationship of the vehicles including the host vehicle, a vehicle in front of the host vehicle, and the target vehicle satisfy admitting requirements for admitting the host vehicle to yield to the target vehicle, performs yielding control to stop the host vehicle at a yielding position for allowing the target vehicle to enter the traveling lane.

SUMMARY

If determination is performed multiple times regarding whether or not yielding control for a merging vehicle traveling on a merging lane is necessary and results of such determinations frequently vary, the vehicle frequently changes its behavior correspondingly, which may cause a driver and surrounding traveling participants a feeling of strangeness.

It is an object of the present disclosure to provide a travel controller that can perform yielding control without causing a driver and surrounding traveling participants a feeling of strangeness.

Given below is a summary of the present disclosure.

(1) A travel controller, comprising a processor configured to:
  determine whether or not a traveling lane in which a vehicle is traveling is a merged lane into which a merging lane merges,
  while the traveling lane is being determined to be the merged lane, repeatedly perform a yielding determination to detect a merging vehicle traveling in the merging lane from peripheral data that represents a surrounding situation of the vehicle and to determine whether or not yielding control for securing a larger space for the merging vehicle to change the lane to the merged lane is necessary, the yielding determination at the first time being performed based on a relative positional relationship between the merging vehicle and the vehicle, the yielding determinations at the second and subsequent times being performed based at least on a result of a previous yielding determination, and
  control travel of the vehicle according to a result of the yielding determination.

(2) The travel controller according to (1) described above, wherein
  when the yielding determination indicates that the yielding control is necessary, the processor stores a first value in a memory as a value representing the result of the yielding determination,
  when the yielding determination indicates that the yielding control is not necessary, the processor stores a second value in the memory as a value representing the result of the yielding determination, the second value being different from the first value, and
  the processor performs the yielding determinations at the second and subsequent times based on a sum calculated by adding a value representing the result of the yielding determination based on the relative positional relationship between the merging vehicle and the vehicle and a value representing the result of the previous the yielding determination, respectively, in a predetermined ratio.

(3) The travel controller according to (2) described above, wherein the first value is larger than the second value, and
  the processor determines in the yielding determinations at the second and subsequent times that the yielding control is necessary when the sum is larger than a predetermined yielding necessity threshold and determines that the yielding control is not necessary when the sum is smaller than the yielding necessity threshold.

(4) The travel controller according to any one of (1) to (3) described above, wherein the processor further determines whether or not the merging vehicle is yielding to the vehicle, and
  when the merging vehicle is determined to be yielding to the vehicle in the yielding determination, the processor determines that the yielding control is not necessary after the determination irrespective of the relative positional relationship between the merging vehicle and the vehicle and the result of the previous the yielding determination, and when the merging vehicle is determined not to be yielding to the vehicle, the processor uses the result of the previous of the yielding determination in the yielding determinations at the second and subsequent times.

(5) The travel controller according to any one of (1) to (4) described above, wherein the processor determines, in the yielding determination, that the yielding control is not necessary when the vehicle is expected to be faster than the merging vehicle and go into a position ahead of the merging vehicle when the merging vehicle reaches a merge start point where the merging vehicle can start a lane change into the merged lane, and that the yielding control is necessary when the vehicle is expected to be slower than the merging vehicle and go into a position behind the merging vehicle when the merging vehicle reaches a merge end point where the merging vehicle cannot start the lane change into the merged lane.

(6) A travel control method performed by a travel controller, the method including:
  determining whether or not a traveling lane in which a vehicle is traveling is a merged lane into which a merging lane merges,
  while the traveling lane is being determined to be the merged lane, repeatedly performing a yielding determination to detect a merging vehicle traveling on the merging lane from peripheral data that represents a surrounding situation of the vehicle and to determine whether or not yielding control for securing a larger space for the merging vehicle to change the lane to the merged lane is necessary, the yielding determination at the first time being performed based on a relative positional relationship between the merging vehicle and the vehicle, the yielding determinations at the second and subsequent times being performed based at least on a result of a previous yielding determination, and controlling travel of the vehicle according to a result of the yielding determination.

(7) A non-transitory computer-readable medium having a computer program for travel control stored therein, the computer program causing a computer mounted on a vehicle to execute a process comprising:

determining whether or not a traveling lane in which a vehicle is traveling is a merged lane into which a merging lane merges, while the traveling lane is being determined to be the merged lane, repeatedly performing a yielding determination to detect a merging vehicle traveling on the merging lane from peripheral data that represents a surrounding situation of the vehicle and to determine whether or not yielding control for securing a larger space for the merging vehicle to change the lane to the merged lane is necessary, the yielding determination at the first time being performed based on a relative positional relationship between the merging vehicle and the vehicle, the yielding determinations at the second and subsequent times being performed based at least on a result of a previous yielding determination, and control travel of the vehicle according to the result of the yielding determination.

According to the present disclosure, yielding control can be performed without giving a driver and surrounding traffic participants a feeling of strangeness.

DESCRIPTION OF EMBODIMENTS

A travel controller that can perform yielding control without giving a driver or surrounding traffic participants a feeling of strangeness will now be described in detail with reference to the attached drawings. The travel controller determines whether or not a traveling lane in which a vehicle is traveling is a merged lane into which a merging lane merges. The merging lane is included on a road which is different from a road that includes the traveling lane, and has a segment that allows vehicles to make a lane change (merge) into the traveling lane. While the traveling lane is being determined to be the merged lane, the travel controller repeatedly performs a yielding determination to detect a merging vehicle traveling on the merging lane from peripheral data that represents a surrounding situation of the vehicle and to determine whether or not yielding control for securing a larger space for the merging vehicle to change the lane to the merged lane is necessary. The travel controller performs the yielding determination at the first time based on a relative positional relationship between the merging vehicle and the vehicle, and performs the yielding determinations at the second and subsequent times based at least on a result of a previous yielding determination. The travel controller then controls travel of the vehicle according to the result of the yielding determination.

Figure 1:
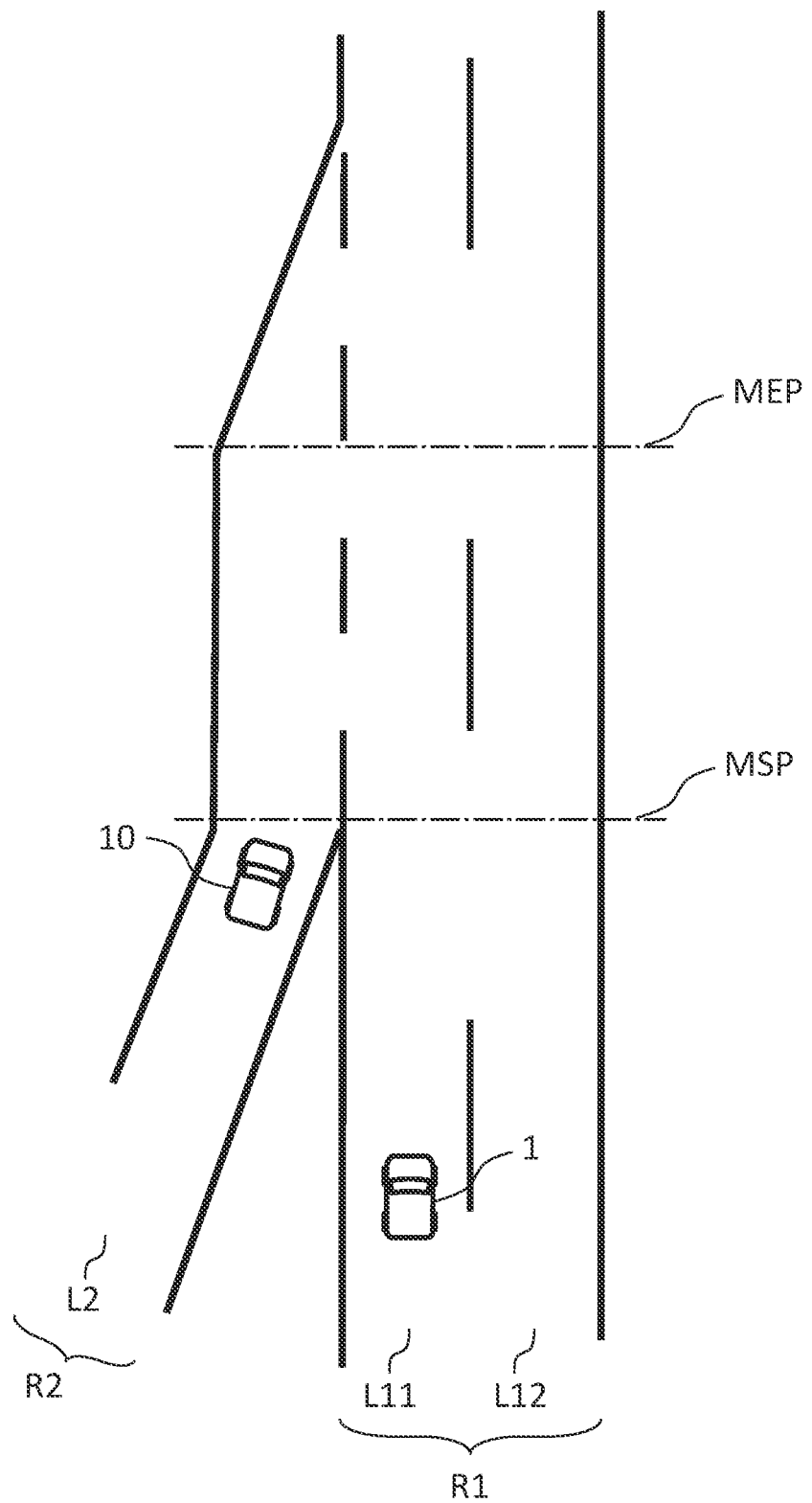
FIG. 1 illustrates a traveling situation of a vehicle in a merged lane.

FIG. 1 illustrates a traveling situation of a vehicle on a merged lane.

A vehicle 1 travels on a lane L11 of a road R1 including lanes L11 and L12. A merging vehicle 10 travels on a lane L2 of a road R2 including the lane L2. The lane L2 merges into the lane L11. The lane L2 corresponds to the merging lane and the lane L11 corresponds to the merged lane. The merging vehicle 10 traveling in the lane L2 can start a lane change to the lane L11 between a merge start point MSP and a merge end point MEP. The merge start point MSP is a point at which the merging vehicle 10 becomes capable of starting the lane change to the lane L11, and, in the example illustrated in FIG. 1, is a point where a lane line of the lane L2 on the lane L11 side and a lane line of the lane L11 on the lane L2 side join. The merge end point MEP is a point at which the merging vehicle 10 becomes not capable of starting the lane change to the lane L11, and, in the example illustrated in FIG. 1, is a point where the distance between the lane line of the lane L2 on the opposite side from the lane L11 and the lane line of the lane L11 on the lane L2 side gets smaller than the distance therebetween at the merge start point MSP. In FIG. 1, lines traversing the road R1 respectively through the merge start point MSP and the merge end point MEP are shown as virtual lines representing the merge start point MSP and the merge end point MEP, respectively.

Figure 2:
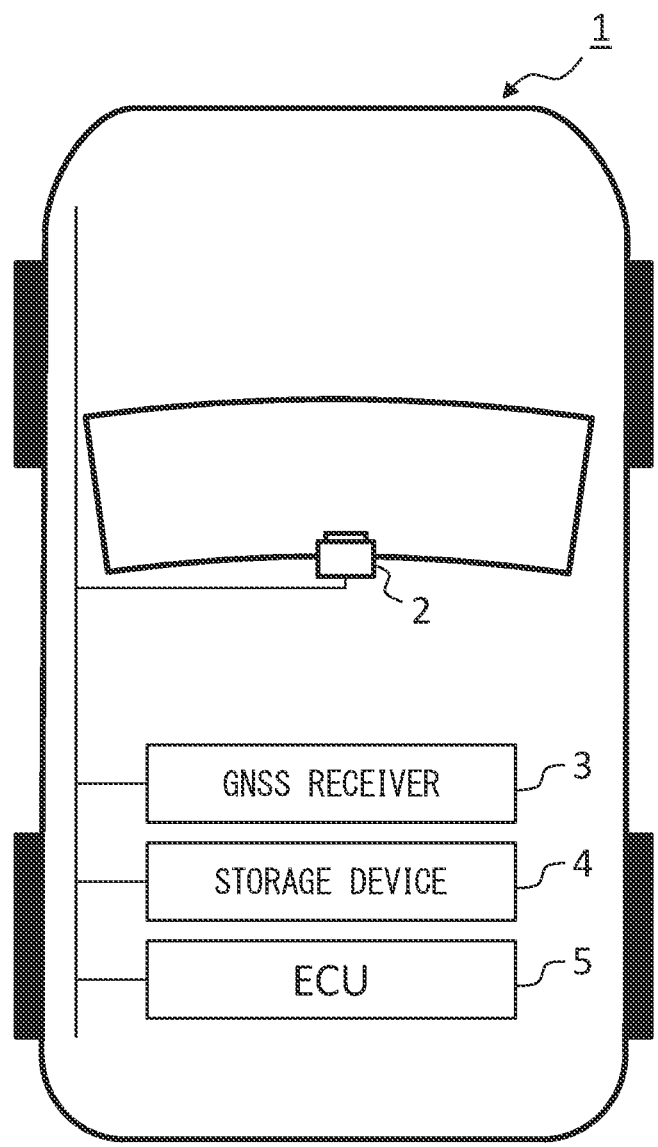
FIG. 2 schematically illustrates the configuration of a vehicle equipped with a travel controller.

FIG. 2 schematically illustrates the configuration of the vehicle equipped with a travel controller.

The vehicle 1 includes a peripheral camera 2, a GNSS (Global Navigation Satellite System) receiver 3, a storage device 4, and an ECU (Electronic Control Unit) 5. The ECU 5 is an example of the travel controller. The peripheral camera 2, the GNSS receiver 3, the storage device 4, and the ECU 5 are connected via an in-vehicle network conforming to a standard, such as a controller area network, so that they can communicate with each other.

The peripheral camera 2 is an example of a peripheral sensor for generating the peripheral data that represents the surrounding situation of the vehicle 1. The peripheral camera 2 includes a two-dimensional detector constructed from an array of optoelectronic transducers, such as CCD or CMOS, having sensitivity to visible light and a focusing optical system that forms an image of a target region on the two-dimensional detector. The peripheral camera 2 is disposed, for example, in a front and upper part in the interior of the vehicle and oriented forward, takes a picture of the surrounding situation of the vehicle 1 through a windshield every predetermined capturing period (e.g., 1/30 to 1/10 seconds), and outputs peripheral images representing the surrounding situation as the peripheral data.

The GNSS receiver 3 receives GNSS signals from a GNSS satellite at a predetermined intervals, and determines the position of the vehicle 1, based on the received GNSS signals. The GNSS receiver 3 outputs positioning signals each indicating the results of determination of the position of the vehicle 1 based on the GNSS signals to the ECU 5 via the in-vehicle network at predetermined intervals.

The storage device 4, which is an example of a storage unit, includes, for example, a hard disk drive or a non-volatile semiconductor memory. The storage device 4 contains map data including information on features, such as lane lines, in association with their positions.

The ECU 5 uses the peripheral data that represents the surrounding situation of the vehicle 1 to determine whether or not the traveling lane in which the vehicle 1 is traveling is the merged lane into which a merging lane merges. While the traveling lane is being determined to be the merged lane, the ECU 5 repeatedly performs the yielding determination to detect a merging vehicle traveling in the merging lane from the peripheral data and to determine whether or not yielding control for securing a larger space for the merging vehicle to change the lane to the merged lane is necessary. The ECU 5 then controls travel of the vehicle 1 according to the result of the yielding determination.

Figure 3:
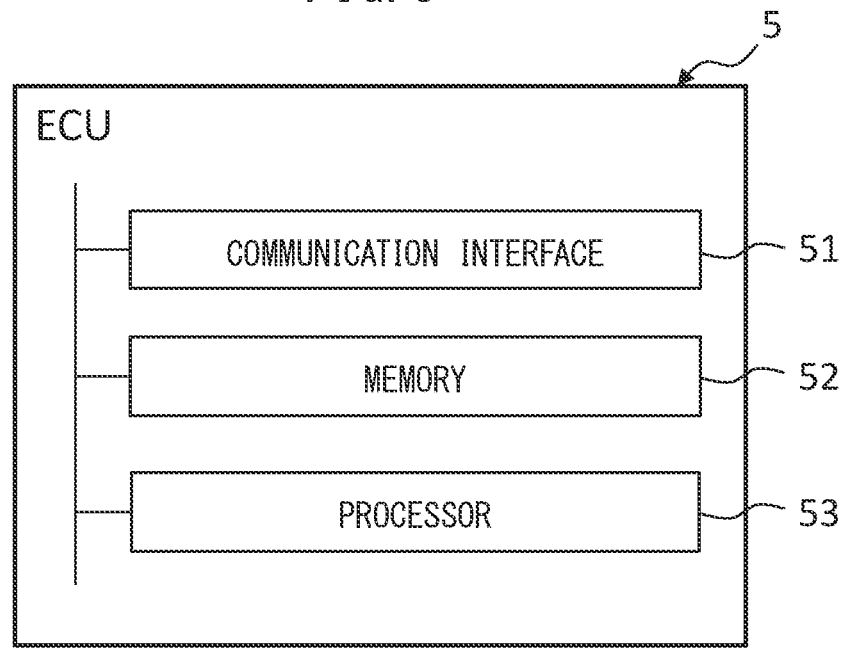
FIG. 3 schematically illustrates the hardware of an ECU.

FIG. 3 schematically illustrates the hardware of the ECU 5. The ECU 5 includes a communication interface 51, a memory 52, and a processor 53.

The communication interface 51, which is an example of a communication unit, includes a communication interface circuit for connecting the ECU 5 to the in-vehicle network. The communication interface 51 provides received data for the processor 53, and outputs data provided from the processor 53 to an external device.

The memory 52 includes volatile and nonvolatile semiconductor memory. The memory 52 contains various types of data used for processing by the processor 53, e.g., values representing the results of the yielding determinations in respective cases where the yielding control is determined to be "necessary" and "not necessary", a predetermined ratio used in the yielding determinations at the second and subsequent times for adding a value representing the result of the yielding determination and a value representing the result of the previous yielding determination to calculate a sum, and a yielding necessity threshold for determining whether or not the yielding control is necessary based on the sums calculated in the yielding determinations at the second and subsequent times. The memory 52 also contains various application programs, such as a travel control program to execute a process therefor.

The processor 53, which is an example of a control unit, includes one or more processors and peripheral circuits thereof. The processor 53 may further include another operating unit, such as a logic-arithmetic unit, an arithmetic logic unit, or a graphics processing unit.

Figure 4:
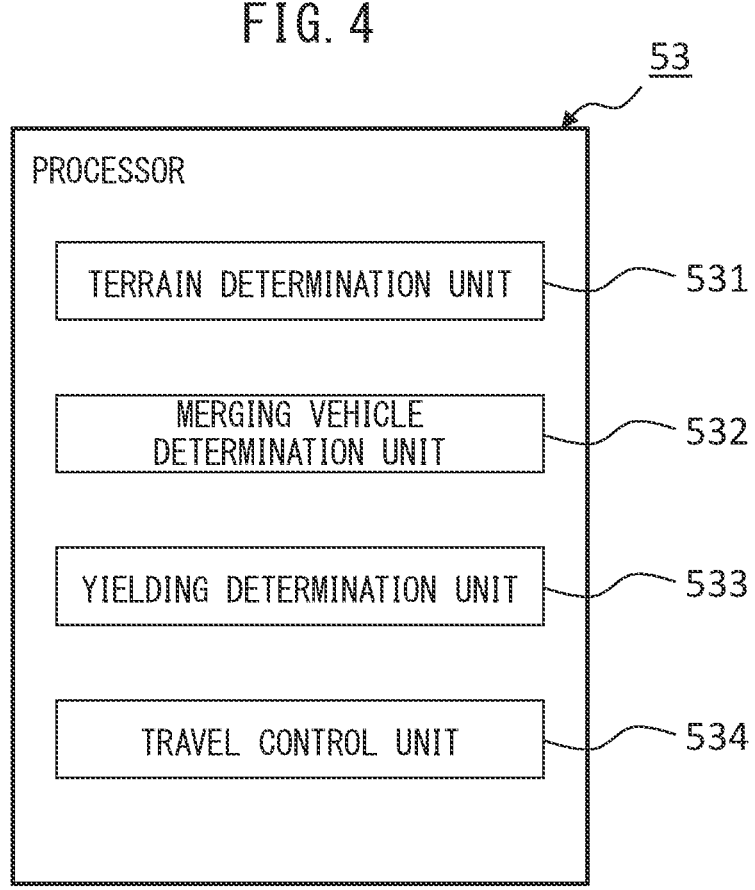
FIG. 4 is a functional block diagram of a processor included in the ECU.

FIG. 4 is a functional block diagram of the processor 53 included in the ECU 5.

As its functional blocks, the processor 53 of ECU 5 includes a terrain determination unit 531, a merging vehicle determination unit 532, a yielding determination unit 533, and a travel control unit 534. These units included in the processor 53 are functional modules implemented by a computer program stored in the memory 52 and executed on the processor 53. The computer program for achieving the functions of the units of the processor 53 may be provided in a form recorded on a computer-readable and portable medium, such as a semiconductor memory, a magnetic recording medium, or an optical recording medium. Alternatively, the units included in the processor 53 may be implemented in the ECU 5 as separate integrated circuits, microprocessors, or firmware.

The terrain determination unit 531 determines whether or not the traveling lane in which the vehicle 1 is traveling is the merged lane into which a merging lane merges, based on the peripheral data that represents the surrounding situation of the vehicle 1.

The terrain determination unit 531 acquires lane information of roads around the self-location, indicated by positioning signals received from the GNSS receiver 3, from the storage device 4 via the communication interface 51. The terrain determination unit 531 inputs peripheral images acquired from the peripheral camera 2 via the communication interface 51 to a classifier that has been trained to detect detection targets such as the lane lines from the images, thereby detecting the lane lines from the peripheral images. Based on the lane line detected from the peripheral images, the terrain determination unit 531 identifies a lane, which corresponds to the traveling lane in which the vehicle 1 is traveling, out of one or more lanes included on the road. For example, if two lanes are included in the lane information acquired from the storage device 4 and the peripheral images includes one lane line detected on the left side of the vehicle 1 and two lanes on the right side, the terrain determination unit 531 can identify the left lane of the two lanes as the traveling lane. The terrain determination unit 531 then identifies the position of the traveling lane in the lane information acquired from the storage device 4 and determines whether or not the traveling lane is the merged lane.

The classifier may be, for example, a convolutional neural network (CNN) including convolutional layers connected in series from the input toward the output, such as Single Shot MultiBox Detector and Faster R-CNN. A CNN that has been trained using images including detection targets such as the lane lines as training data in advance in accordance with a predetermined training algorithm such as backpropagation, the CNN operates as a classifier for detecting the lane lines from peripheral images.

The terrain determination unit 531 may acquire the lane information, which corresponds to the self-location indicated by the positioning signals received from the GNSS receiver, from the storage device 4 to determine whether or not the traveling lane is a merged lane.

The merging vehicle determination unit 532 determines whether or not the merging vehicle 10 is yielding to the vehicle 1. For example, if the merging vehicle 10 is decelerating (acceleration is negative), the merging vehicle determination unit 532 may determine that the merging vehicle 10 is yielding to the vehicle 1.

The merging vehicle determination unit 532 inputs a series of peripheral images, which are taken by the peripheral camera 2 within a latest predetermined period, to the classifier that has been trained in advance to detect detection targets such as vehicles from the images, thereby detecting the merging vehicle 10 from each of the series of peripheral images. The merging vehicle determination unit 532 identifies an orientation of the merging vehicle 10 with respect to the vehicle 1 based on the position where the merging vehicle 10 is detected in the peripheral images. Based on the lane information acquired from the storage device 4 according to the self-location indicated by the positioning signals received from the GNSS receiver 3, the merging vehicle determination unit 532 identifies, from the self-location, a direction of travel of the merging vehicle 10 in the merging lane located in the identified orientation of the merging vehicle 10, and estimates a direction of the merging vehicle 10 with respect to the vehicle 1. The merging vehicle determination unit 532 estimates the distance to the merging vehicle 10 based on a ratio between the size of the area in each of the peripheral images where the merging vehicle 10 is present and a reference size of the merging vehicle 10 in the estimated direction in the image in a case where the distance to the merging vehicle 10 is a reference distance, and the real size of the merging vehicle The merging vehicle determination unit 532 estimates a relative position of the merging vehicle with respect to the vehicle 1 based on the orientation of the merging vehicle 10 from the vehicle 1 and the distance to the merging vehicle 10 detected from each of the series of peripheral images taken by the peripheral camera 2 within a latest certain period and the position of the vehicle 1 at the moment when each of the series of peripheral images is generated. The merging vehicle determination unit 532 divides a distance of relative position of the merging vehicle 10 in a pair of the peripheral images of the series of peripheral images by a time interval when the pair of peripheral images are taken to estimate the velocity of the merging vehicle 10 corresponding to the time interval when the pair of the peripheral images are taken. The reference distance, the reference size of the detected merging vehicle 10 in the images and the size of the real space may be stored, for example, in the memory 52 in advance. The merging vehicle determination unit 532 estimates the velocity of the merging vehicle 10 at each of a first time point and a second time point, which is later than the first time point, included in the certain period and, if the velocity at the second time point is slower than that at the first time point, determines that the merging vehicle is yielding to the vehicle 1.

The vehicle 1 may include a Light Detection and Ranging (LiDAR) sensor configured to generate a range image whose pixels each have a value depending on the distance to an object represented in the pixel. In this case, in the distance image, the merging vehicle determination unit 532 may take the distance to an object, which is present in the orientation of the merging vehicle shown in the peripheral images, as the distance to the merging vehicle 10.

While the traveling lane is being determined to be the merged lane, the yielding determination unit 533 repeatedly performs the yielding determination to detect a merging vehicle traveling on the merging lane from the peripheral images and to determine whether or not yielding control for securing a larger space for the merging vehicle 10 to change the lane to the merged lane is necessary.

The yielding determination unit 533 performs the yielding determination at the first time based on a relative positional relationship including the relative position and the relative velocity of the merging vehicle 10 with respect to the vehicle 1 detected from the peripheral images.

For example, assume that the vehicle 1 is traveling 40 m behind the merge start point MSP at 90 km/h (constant velocity). Also assume that the merging vehicle 10 is traveling 40 m behind the merge start point MSP at 72 km/h (constant velocity). In other words, the merging vehicle 10 is traveling side by side with the vehicle 1 at a relative velocity of −18 km/h.

In this case, the yielding determination unit 533 estimates, from the relative positional relationship, that the merging vehicle 10 will reach the merge start point MSP in 2 seconds and that the vehicle 1 will reach 10 m ahead of the merge start point MSP when the merging vehicle reaches the merge start point MSP. In other words, the yielding determination unit 533 estimates that the position of the vehicle 1 will be ahead of the merging vehicle 10 when the merging vehicle reaches the merge start point MSP. The yielding determination unit 533 also estimates that the vehicle 1 is faster than the merging vehicle 10 (the relative velocity of the merging vehicle 10 with respect to the vehicle 1 is negative) when the merging vehicle 10 reaches the merge start point MSP. In this case, the yielding determination unit 533 determines that the yielding control is not necessary.

For example, assume that the vehicle 1 is traveling 55 m behind the merge end point MEP at 90 km/h (constant velocity). Also assume that the merging vehicle 10 is traveling 48 m behind the merge end point MEP at a velocity of 80 km/h, and an acceleration of the merging vehicle 10 is 2 m/s$^2$. In other words, the merging vehicle 10 is traveling 7 m ahead of the vehicle 1 at a relative velocity of +10 km/h.

In this case, the yielding determination unit 533 estimates, from the relative positional relationship, that the merging vehicle 10 will reach the merge end point MEP in 2 seconds and that the vehicle 1 will reach 5 m behind the merge end point MEP at a time point when the merging vehicle 10 reaches the merge end point MEP. In other words, the yielding determination unit 533 estimates that the position of the vehicle 1 will be behind the merging vehicle 10 when the merging vehicle 10 reaches the merge end point MEP. The yielding determination unit 533 also estimates that the velocity of the merging vehicle 10 will be 94 km/h, which is faster than the vehicle 1 (the relative velocity of the merging vehicle 10 with respect to the vehicle 1 is positive) when the merging vehicle 10 reaches the merge end point MEP. In this case, the yielding determination unit 533 determines that the yielding control is necessary.

The yielding determination unit 533 may determine, from the relative positional relationship, that the yielding control is not necessary if it is expected that the vehicle 1 is slower than the merging vehicle 10 and the position of the vehicle 1 will be behind the merging vehicle when the merging vehicle 10 reaches the merge start point MSP. The yielding determination unit 533 may also determine, from the relative positional relationship, that the yielding control is not necessary if it is expected that the vehicle 1 is faster than the merging vehicle 10 and the position of the vehicle 1 will be ahead of the merging vehicle 10 when the merging vehicle 10 reaches the merge end point MEP.

In the yielding determinations at the second and subsequent times, the yielding determination unit 533 uses at least the result of the previous yielding determination. For example, the yielding determination unit 533 temporarily stores a value representing the result of the yielding determination based on the relative positional relationship between the merging vehicle and the vehicle 1 performed within the latest certain period (for example, "yielding control necessary": 1, "yielding control not necessary": −1, and "neither": 0) in the memory 52. In the yielding determinations at the second and subsequent times, the yielding determination unit 533 performs the yielding determination by using a sum calculated by adding the value representing the result of the yielding determination based on the relative positional relationship between the merging vehicle 10 and the vehicle 1 and a value representing the result of the previous (for example, the last) yielding determination, respectively, at a predetermined ratio (for example, 0.3, 0.7 in order). The yielding determination unit 533 determines that the yielding control is necessary if the sum is larger than the yielding necessary threshold (for example, 0.5), and determines that the yielding control is not necessary if the sum is smaller than the yielding unnecessary threshold (for example, −0.5).

For example, assume that the result of a yielding determination based on the relative positional relationship between the merging vehicle 10 and the vehicle 1 is "yielding control necessary" (value: 1) and the result of a previous yielding determination is "neither" (value: 0). At this time, the sum obtained by using the above-described ratio is 0.3. In this case, since the sum is not larger than the yielding necessary threshold and is not below the yielding unnecessary threshold, the yielding determination unit 533 determines "neither" and maintains the result of the previous yielding determination. In the case of the determination "neither", traveling control at least other than the yielding control is performed, as will be described later.

With such a yielding determination, the ECU 5 can perform the yielding determination repeatedly to avoid frequent changes in results, thereby reducing a feeling of strangeness that the driver or other traffic participants may have.

In the yielding determinations at the second and subsequent times, the yielding determination unit 533 may set the predetermined ratio to be 0 for the value representing the result of the yielding determination based on the relative positional relationship between the merging vehicle 10 and the vehicle 1. If the merging vehicle 10 is determined to be yielding to the vehicle 1, the yielding determination unit 533 may determine that the yielding control after the corresponding determination is not necessary irrespective of the relative positional relationship between the merging vehicle 10 and the vehicle 1 and the result of the previous yielding determination. If the merging vehicle 10 is determined not to be yielding to the vehicle 1, the yielding determination unit 533 may use the result of the previous yielding determination as-is in the yielding determinations at the second and subsequent times.

With such a yielding determination, even in a case where the merging vehicle 10 makes an attempt to yield after the yielding control is determined to be necessary in the yielding determination at the first time, the ECU 5 can avoid a situation where both of the vehicle 1 and the merging vehicle 10 yield to each other.

In the yielding determinations at the second and subsequent times, the yielding determination unit 533 may differentiate the ratio to be used for calculating the value representing the result of the yielding determination based on the relative positional relationship between the merging vehicle 10 and the vehicle 1 and the value representing the result of the previous yielding determination according to the distance from the vehicle 1 to the merge end point MEP. For example, the yielding determination unit 533 may set the ratio in such a manner that the shorter the distance from the vehicle 1 to the merge end point MEP, the smaller the ratio of the value representing the result of the yielding determination based on the relative positional relationship between the merging vehicle 10 and the vehicle 1 and the larger the ratio of the value representing the result of the previous yielding determination. With the ratio set in this manner, the ECU 5 can avoid frequent changes in the results of the yielding determination when the distance to the merge end point MEP is relatively short.

The yielding determination unit 533 may also differentiate the ratio to be used for adding the value representing the result of the yielding determination based on the relative positional relationship between the merging vehicle 10 and the vehicle 1 and the value representing the result of the previous yielding determination in the yielding determination at the second and subsequent times according to the number of repetitions of the yielding determinations while the traveling lane is being determined to be the merged lane. For example, the yielding determination unit 533 may set the ratio in such a manner that the more the number of repetitions of the yielding determinations (for example, larger in the third yielding determination than in the second yielding determination), the smaller the ratio of the value representing the result of the yielding determination based on the relative positional relationship between the merging vehicle 10 and the vehicle 1 and the larger the ratio of the value representing the result of the previous yielding determination. With the ratio set in this manner, the ECU 5 can avoid frequent changes in the results of the yielding determination when the distance to the merge end point MEP is short every time when the yielding determination is repeated while the traveling lane is being determined to be the merged lane.

The travel control unit 534 controls travel of the vehicle 1 according to the result of the yielding determination.

If the yielding determination is determined to be necessary, the travel control unit 534 performs yielding control for securing a larger space for the merging vehicle 10 to merge with the merged lane (the lane L11). For example, the travel control unit 534 increases the velocity of the vehicle 1 if the relative velocity of the merging vehicle 10 with respect to the vehicle 1 is negative and increases the space for the merging vehicle 10 to merge on the rear side of the vehicle 1. Likewise, the travel control unit 534 decreases the velocity of the vehicle 1 if the relative velocity of the merging vehicle 10 with respect to the vehicle 1 is positive and increases the space for the merging vehicle 10 to merge on the front side of the vehicle 1.

The travel control unit 534 controls travel of the vehicle 1 by transmitting predetermined control signals to a travel mechanism (not illustrated) of the vehicle 1 via the communication interface 51. The traveling mechanism includes, for example, an engine or a motor for accelerating the vehicle 1, and a brake for decelerating the vehicle 1.

The travel control unit 534 performs travel control other than the yielding control if the yielding determination is neither determined to be necessary nor not necessary. The travel control other than the yielding control may be a vehicle following control for controlling travel to maintain the constant distance to a leading vehicle traveling ahead of the vehicle 1 in the traveling lane. The travel control unit 534 may perform vehicle velocity maintenance control for maintaining a preset velocity as the travel control other than the yielding control.

Figure 5:
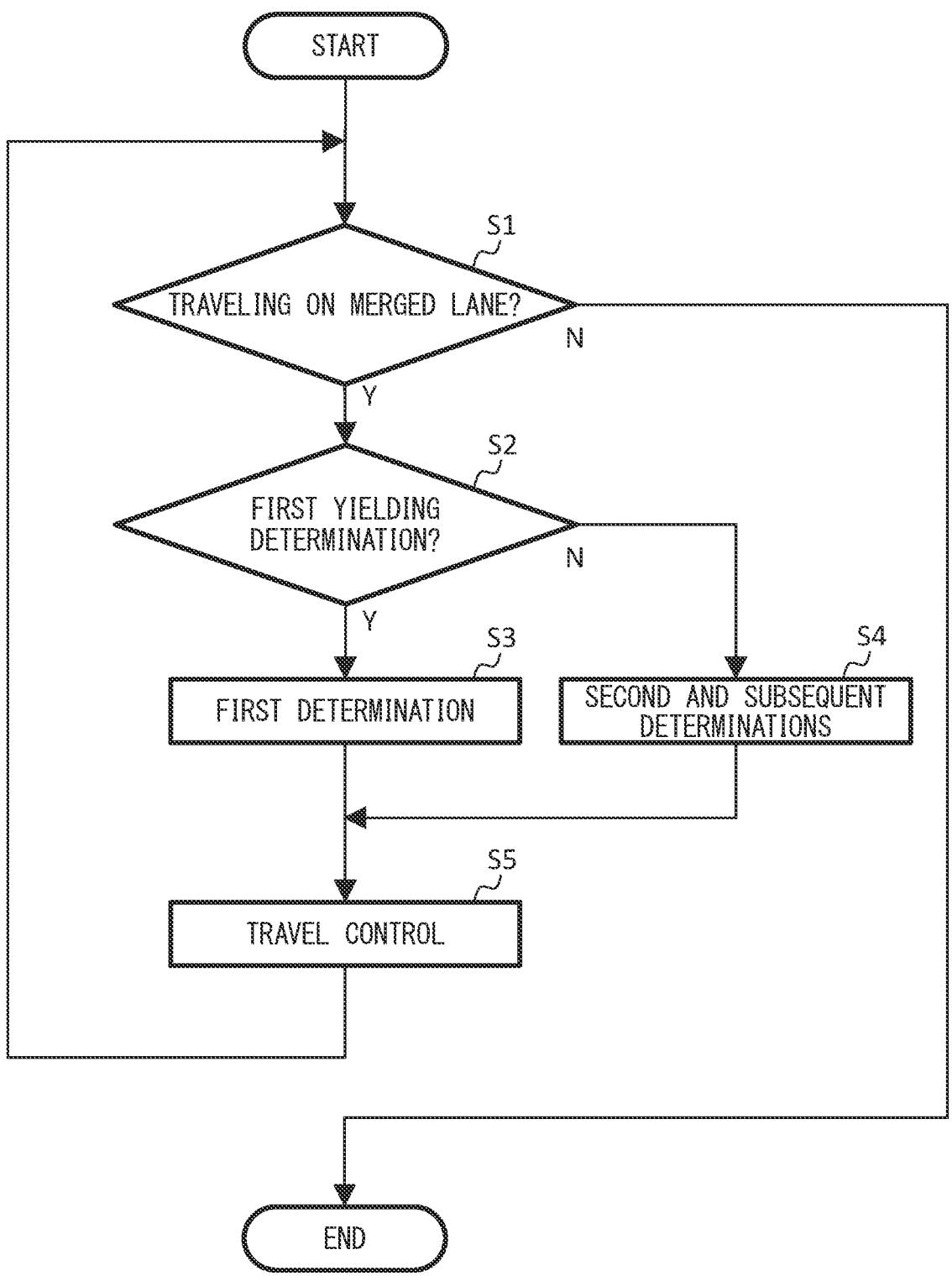
FIG. 5 is a flowchart of a travel control process.

FIG. 5 is a flowchart of a travel control process. The ECU 5 repeats the process at predetermined time intervals (for example, intervals of 1/10 seconds) while the vehicle 1 travels under autonomous driving control.

First, based on the peripheral data indicating the surrounding situation of the vehicle 1, the terrain determination unit 531 of the processor 53 of the ECU 5 determines whether or not the traveling lane in which the vehicle 1 is traveling is the merged lane into which a merging lane merges (Step S1).

If it is determined that the traveling lane is not a merged lane (Step S1: N), the terrain determination unit 531 terminates the travel control process. Note that the autonomous driving control of the vehicle 1 is continued in this case.

If it is determined that the traveling lane is a merged lane (Step S1: Y), the yielding determination unit 533 of the processor 53 determines whether or not a value representing the result of the yielding determination after the traveling lane is determined to be the merged lane is stored in the memory 52 (whether or not it is the yielding determination at the first time) (Step S2).

If it is determined to be the yielding determination at the first time (Step S2: Y), the yielding determination unit 533 performs the yielding determination based on the relative positional relationship between the merging vehicle 10 and the vehicle 1, and temporarily stores a value representing the result of the yielding determination in the memory 52 (Step S3).

If it is determined not to be the yielding determination at the first time (Step S2: N), the yielding determination unit 533 performs the yielding determination based at least on the result of the previous yielding determination and temporarily stores a value representing the result of the yielding determination in the memory 52 (Step S4).

The travel control unit 534 of the ECU 5 controls travel of the vehicle 1 according to the result of the yielding determination (Step S5), and returns the process of the ECU 5 to Step S1.

With the execution of the travel control process in this manner, the ECU 5 can perform yielding control without giving a driver and surrounding traffic participants a feeling of strangeness.

Note that those skilled in the art can apply various changes, substitutions, and modifications without departing from the spirit and scope of the present disclosure.

What is claimed is:

1. A travel controller, comprising a processor configured to
   determine whether or not a traveling lane in which a vehicle is traveling is a merged lane into which a merging lane merges,
   while the traveling lane is being determined to be the merged lane, repeatedly perform a yielding determination to detect a merging vehicle traveling in the merging lane from peripheral data that represents a surrounding situation of the vehicle and to determine whether or not yielding control for securing a larger space for the merging vehicle to change the lane to the merged lane is necessary, the yielding determination at a first time being performed based on a relative positional relationship between the merging vehicle and the vehicle, the yielding determinations at a second and subsequent times after the first time being performed based at least on a result of a necessity of the yielding control on an immediately preceding yielding determination, and
   control travel of the vehicle according to a result of the yielding determination.

2. The travel controller according to claim 1, wherein
   when the yielding determination indicates that the yielding control is necessary, the processor stores a first value in a memory as a value representing the result of the yielding determination
   when the yielding determination indicates that the yielding control is not necessary, the processor stores a second value in the memory as a value representing the result of the yielding determination, the second value being different from the first value, and
   the processor performs the yielding determinations at the second and the subsequent times based on a sum calculated by adding a value representing the result of the yielding determination based on the relative positional relationship between the merging vehicle and the vehicle and a value representing the result of the previous yielding determination, respectively, in a predetermined ratio.

3. The travel controller according to claim 2, wherein the first value is larger than the second value, and
   the processor determines in the yielding determinations at the second and subsequent times that the yielding control is necessary when the sum is larger than a predetermined yielding necessity threshold, and determines that the yielding control is not necessary when the sum is smaller than the yielding necessity threshold.

4. The travel controller according to claim 1, wherein the processor further determines whether or not the merging vehicle is yielding to the vehicle, and
   when the merging vehicle is determined to be yielding to the vehicle in the yielding determination, the processor determines that the yielding control is not necessary after the determination, irrespective of the relative positional relationship between the merging vehicle and the vehicle and the result of the previous yielding determination, and when the merging vehicle is determined not to be yielding to the vehicle, the processor uses the result of the previous yielding determination in the yielding determinations at the second and subsequent times.

5. The travel controller according to claim 1, wherein the processor determines, in the yielding determination, that the yielding control is not necessary when the vehicle is expected to be faster than the merging vehicle and go into a position ahead of the merging vehicle when the merging vehicle reaches a merge start point where the merging vehicle can start a lane change into the merged lane, and that the yielding control is necessary when the vehicle is expected to be slower than the merging vehicle and go into a position behind the merging vehicle when the merging vehicle reaches a merge end point where the merging vehicle cannot start the lane change into the merged lane.

6. A travel control method performed by a travel controller, the method comprising:
   determining whether or not a traveling lane in which a vehicle is traveling is a merged lane into which a merging lane merges,
   while the traveling lane is being determined to be the merged lane, repeatedly performing a yielding determination to detect a merging vehicle traveling in the merging lane from peripheral data that represents a surrounding situation of the vehicle and to determine whether or not yielding control for securing a larger space for the merging vehicle to change the lane to the merged lane is necessary, the yielding determination at a first time being performed based on a relative positional relationship between the merging vehicle and the vehicle, the yielding determinations at a second and subsequent times after the first time being performed based at least on a result of a necessity of the yielding control on an immediately preceding yielding determination, and
   controlling travel of the vehicle according to a result of the yielding determination.

7. A non-transitory computer-readable medium having a computer program for travel control stored therein, the computer program causing a computer mounted on a vehicle to execute a process comprising:
   determining whether or not a traveling lane in which a vehicle is traveling is a merged lane into which a merging lane merges;
   while the traveling lane is being determined to be the merged lane, repeatedly performing a yielding determination to detect a merging vehicle traveling in the merging lane from peripheral data that represents a surrounding situation of the vehicle and to determine whether or not yielding control for securing a larger space for the merging vehicle to change the lane to the merged lane is necessary, the yielding determination at a first time being performed based on a relative positional relationship between the merging vehicle and the vehicle, the yielding determinations at a second and subsequent times after the first time being performed based at least on a result of a necessity of the yielding control on an immediately preceding yielding determination; and
   control travel of the vehicle according to the result of the yielding determination.

* * * * *